Figure 1:
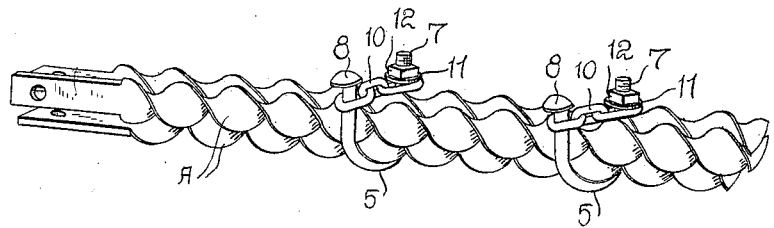

J. B. CRUCHELOW.
FASTENING DEVICE.
APPLICATION FILED DEC. 24, 1917.

1,278,862.

Patented Sept. 17, 1918.

Inventor
J. B. CRUCHELOW

By Watson E. Coleman
Attorney

UNITED STATES PATENT OFFICE.

JAMES B. CRUCHELOW, OF ALBIA, IOWA.

FASTENING DEVICE.

1,278,862.

Specification of Letters Patent.  Patented Sept. 17, 1918.

Application filed December 24, 1917.  Serial No. 208,590.

*To all whom it may concern:*

Be it known that I, JAMES B. CRUCHELOW, a citizen of the United States, residing at Albia, in the county of Monroe and State of Iowa, have invented certain new and useful Improvements in Fastening Devices, of which the following is a specification, reference being had to the accompanying drawings.

This invention relates to an improved fastening device and has for its primary object to provide very simple and effective means for fastening together in compact relation, a number of augers such as are used by miners so that they may be conveniently transported.

In the operation of mining machinery, it is frequently necessary to remove the augers and sharpen the same, and so far as I am aware, no easily applied and serviceable means has yet been devised whereby a plurality of the augers can be easily carried from place to place.

The present invention therefore has for its particular object to provide such a fastening device consisting primarily of a clip having certain structural peculiarities which will admit of its easy and quick application to the assembled augers, tie links between the ends of the clip, and removable retaining means for the links engaged upon one of the clip ends.

It is also a general object of the invention to provide a fastening device for mine augers as above characterized, which is exceedingly simple, strong and durable in its construction and capable of manufacture at relatively small cost.

Figure 2:
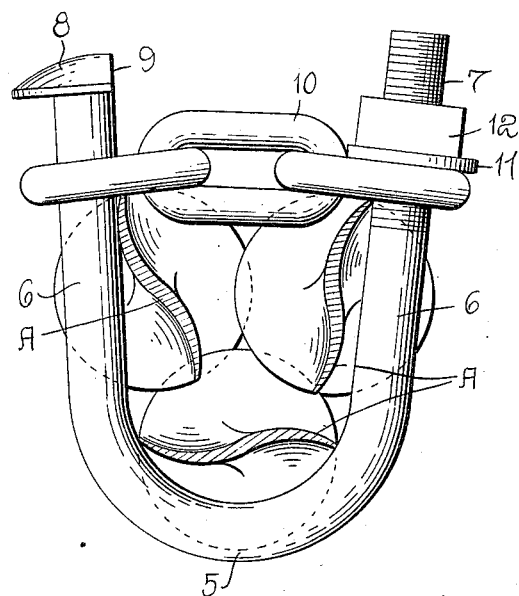

With the above and other objects in view, the invention consists in the improved combination, construction and arrangement of the several parts, which will be hereinafter more fully described, subsequently claimed and illustrated in the accompanying drawings in which similar reference characters designate corresponding parts throughout the several views and wherein;

Figure 1 is a perspective view illustrating a plurality of augers secured together by means of my improved fastening device; and Fig. 2 is an enlarged transverse section.

Referring in detail to the drawing A designates a plurality of augers such as are commonly used in mines for connection with a boring machine.

In the application and use of my improved fastening device, three of the augers are assembled, as shown in Fig. 2. The fastening clip 5 is of U-shape form, said clip having parallel arms 6 one of which has a threaded terminal 7, while the other of the clip arms terminates in a flanged head 8. The side of this head which is opposed to the threaded terminal 7 of the other clip arm is cut away as indicated at 9 so that the distance between the head 8 and the terminal 7 is substantially equal to the diameter of two of the augers. The arms 6 of the clip engage in the valleys of two of the augers and the medial portion of the clip engages in the valley of the third auger so that the three augers are securely and compactly held against relative lateral movement.

The ends of the clip arms are tied or connected together by means of three chain links indicated at 10. One terminal link is permanently engaged on the arm 6 of the clip having the terminal head 8 while the other terminal link is adapted for removable engagement over the threaded end 7 of the other clip arm. A washer plate 11 is then inserted over the end of this clip arm and engaged against the link. Finally a nut 12 is threaded upon the end of the arm 6 and against the washer plate whereby the links 10 are held in connection with the ends of the clip to prevent shifting movement of the latter with respect to the augers.

From the foregoing description taken in connection with the accompanying drawings, the construction, manner of use and several advantages of the device will be clearly and fully understood. By cutting away the side of the head 8 of the clip as above stated, after the three augers have been assembled, as shown in Fig. 2, the clip may be readily arranged in place with its arms 6 disposed upon opposite sides of the augers and the links 10 then secured between the ends of the clip arms, as above explained. The device can also be readily removed by simply removing the nut 12, and then removing the clip laterally from engagement with the augers. By cutting away a side of the head 8, this end of the link will move freely through the valley of the auger engaged by the link arm. Preferably two of the fastening devices are used and engaged upon the augers adjacent their opposite ends. The assembled augers can then be corveniently lifted and carried from the mine to the place where they are to be sharpened. It is now the custom to tie the augers together with a thong or wire and as a consequence many augers are lost, resulting in a considerable expense in the purchase of new augers. Also, such securing means is very ineffective, and the augers move relative to each other, making it quite difficult to carry the same. By means of my device it will be appreciated that these objections are entirely overcome, and the augers may be quickly and securely bound together and removed from the mine. The device is also relatively simple in its construction, as well as strong and durable and can be manufactured at comparatively small cost.

While I have herein shown and described the construction and relative arrangement of the several elements employed, it is to be understood that the device is susceptible of considerable modifications therein, and I therefore reserve the privilege of adopting all such legitimate changes as may be fairly embodied within the spirit and scope of the invention as claimed.

Having thus fully described my invention, what I claim is:—

A fastening device for augers comprising a U-shaped clip having spaced arms between which a plurality of augers are adapted to be arranged, one of the clip arms having a terminal head cut away on the side thereof which is opposed to the other of the clip arms, a series of connected links, one of the terminal links being permanently engaged on the clip arm beneath said head, and the other terminal link being adapted for engagement over the end of the other clip arm, and a nut adapted to be detachably threaded upon the latter clip arm to retain the link in connection therewith.

In testimony whereof I hereunto affix my signature in the presence of two witnesses.

JAMES B. CRUCHELOW.

Witnesses:
CHARLES E. MILLER,
EDMOND B. MORRIS, Jr.

Copies of this patent may be obtained for five cents each, by addressing the "Commissioner of Patents. Washington, D. C."